(12) United States Patent
Rhee et al.

(10) Patent No.: US 11,961,262 B2
(45) Date of Patent: Apr. 16, 2024

(54) SIGNAL PROCESSING APPARATUS AND IMAGE DISPLAY APPARATUS INCLUDING SAME

(71) Applicant: LG ELECTRONICS INC., Seoul (KR)

(72) Inventors: Kwangyeon Rhee, Seoul (KR); Jongchan Kim, Seoul (KR); Dongkyu Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 59 days.

(21) Appl. No.: 17/773,805

(22) PCT Filed: Nov. 1, 2019

(86) PCT No.: PCT/KR2019/014683
§ 371 (c)(1),
(2) Date: May 2, 2022

(87) PCT Pub. No.: WO2021/085693
PCT Pub. Date: May 6, 2021

(65) Prior Publication Data
US 2022/0383551 A1  Dec. 1, 2022

(51) Int. Cl.
*G06T 9/00* (2006.01)
*G06T 1/00* (2006.01)
(Continued)

(52) U.S. Cl.
CPC ............. *G06T 9/00* (2013.01); *G06T 1/0007* (2013.01); *G06T 5/009* (2013.01); *G09G 5/10* (2013.01);
(Continued)

(58) Field of Classification Search
CPC ......... G06T 1/0007; G06T 9/00; G06T 5/009; G09G 2340/0428; G09G 5/10;
(Continued)

(56) References Cited

U.S. PATENT DOCUMENTS 9,781,417 B2 * 10/2017 Ninan .................... H04N 19/85
2013/0314495 A1   11/2013 Chen et al.
(Continued)

FOREIGN PATENT DOCUMENTS

| KR | 1020050019656 | 3/2005 |
| KR | 1020170110090 | 10/2017 |
| KR | 1020190109207 | 9/2019 |

OTHER PUBLICATIONS

Anton Shilov, "HDMI 2.1 Announced: Supports 8Kp60, Dynamic HDR, New Color Space", New 48G Cable. ANANDTECH, www.anandtech.com/show/11003/hdmi-21-announced-8kp60-48gbps-cable], Jan. 5, 2017, 4 pages.
(Continued)

*Primary Examiner* — Phi Hoang
(74) *Attorney, Agent, or Firm* — LEE, HONG, DEGERMAN, KANG & WAIMEY

(57) ABSTRACT

Disclosed are a signal processing device and an image display apparatus including the same. The signal processing device and the image display apparatus including the same according to an embodiment of the present disclosure includes: a first decoder to reconstruct image data received from an external electronic device, an encoder to compress the image data reconstructed in the first decoder, a memory to store the image data compressed in the encoder, and a second decoder to reconstruct the image data stored in the memory. Accordingly, despite of the increases of the amount of the input image data and the bandwidth thereof, the image data may be stored in the memory efficiently.

19 Claims, 12 Drawing Sheets

(51) Int. Cl.
*G06T 5/00* (2006.01)
*G09G 5/10* (2006.01)

(52) U.S. Cl.
CPC . *G09G 2310/08* (2013.01); *G09G 2340/0428* (2013.01)

(58) Field of Classification Search
CPC ....... G09G 2310/08; H04N 21/440263; H04N 21/43635; H04N 21/42692; H04N 21/435; H04N 21/433; H04N 21/4402
See application file for complete search history.

(56) References Cited

U.S. PATENT DOCUMENTS

| | | | |
|---|---|---|---|
| 2016/0277743 A1* | 9/2016 | Ström | H04N 19/426 |
| 2016/0366449 A1* | 12/2016 | Stessen | H04N 19/85 |
| 2019/0052908 A1* | 2/2019 | Mertens | H04N 19/102 |
| 2020/0076133 A1* | 3/2020 | Shen | H01R 13/6473 |
| 2020/0169742 A1* | 5/2020 | Su | H04N 19/1887 |
| 2020/0404343 A1* | 12/2020 | Van Der Vleuten | H04N 19/186 |
| 2021/0116907 A1* | 4/2021 | Altman | G05D 1/0038 |
| 2022/0046245 A1* | 2/2022 | Kadu | H04N 19/80 |

OTHER PUBLICATIONS

PCT International Application No. PCT/KR2019/014683, International Search Report dated Jul. 29, 2020, 4 pages.

* cited by examiner (a)　　　　　　　　(b)　　　　　　　　(c)

SIGNAL PROCESSING APPARATUS AND IMAGE DISPLAY APPARATUS INCLUDING SAME

CROSS-REFERENCE TO RELATED APPLICATIONS

This application is the National Stage filing under 35 U.S.C. 371 of International Application No. PCT/KR2019/014683, filed on Nov. 1, 2019, the contents of which are all incorporated by reference herein in their entirety.

BACKGROUND OF THE DISCLOSURE

1. Field of the Disclosure

The present disclosure relates to a signal processing device and an image display apparatus including the same, and more particularly to a signal processing device and an image display apparatus including the same capable of storing image data efficiently despite of increases of input image data and the bandwidth thereof.

2. Description of the Related Art

A signal processing device is a device that performs signal processing on an input image so as to display an image.

For example, the signal processing device may receive a broadcast signal or an HDMI signal, performs signal processing based on the received broadcast or HDMI signal, and output a processed image signal.

Meanwhile, based on the HDMI 2.1 standard, input image data and the bandwidth thereof are increased.

Accordingly, there is a problem that the image data to be stored in a memory of a signal processing device or an image display apparatus including the signal processing device increases significantly.

SUMMARY

An object of the present disclosure is to provide a signal processing device and an image display apparatus including the same capable of storing image data efficiently despite of increases of input image data and the bandwidth thereof.

Another object of the present disclosure is to provide a signal processing device and an image display apparatus including the same capable of storing image data efficiently in a dynamic HDR mode.

In order to achieve the above objects, there are provided a signal processing device and an image display apparatus including the same according to an embodiment of the present disclosure, and the signal processing device includes: a first decoder to reconstruct image data received from an external electronic device, an encoder to compress the image data reconstructed in the first decoder, a memory to store the image data compressed in the encoder, and a second decoder to reconstruct the image data stored in the memory.

Meanwhile, the memory may store the image data compressed in the encoder based on the image data received from the external electronic device being dynamic High Dynamic Range (HDR) image data.

Meanwhile, the memory does not store the image data compressed in the encoder based on the image data received from the external electronic device being static HDR image data.

Meanwhile, the signal processing device and the image display apparatus including the same according to an embodiment of the present disclosure may receive metadata during a black period of a first frame, wherein the first decoder may reconstruct the image data received from the external electronic device, wherein the encoder may compress the image data reconstructed in the first decoder, and during a second frame subsequent from the first frame, wherein the memory may store the image data compressed in the encoder.

Meanwhile, the memory may store the image data compressed in the encoder based on dynamic HDR mode information being included in the received metadata.

Meanwhile, the memory does not store the image data compressed in the encoder based on static HDR mode information being included in the received metadata.

Meanwhile, the image data received from the external electronic device may include image data compressed based on the HDMI 2.1 standard.

Meanwhile, color information and brightness information of the image data received from the external electronic device may change in a frame unit.

Meanwhile, the encoder may change a compression rate in the image compression based on an amount of data of the image data received from the external electronic device or a receiving bandwidth when receiving the image data.

Meanwhile, while the image data is received from the external electronic device, after a first timing, based on second image data being received from a second electronic device, the encoder may increase a compression rate in the image compression after the first timing.

Meanwhile, the signal processing device and the image display apparatus including the same according to an embodiment of the present disclosure may further include: an HDR processor to perform a high dynamic range process for the image data reconstructed in the second decoder; and an image quality processor to perform an image quality process of the image data processed in the HDR processor.

Meanwhile, a signal processing device and an image display apparatus including the same according to another embodiment of the present disclosure includes: an encoder to compress image data received from an external electronic device, a memory to store the image data compressed in the encoder, and a decoder to reconstruct the image data stored in the memory.

Meanwhile, the signal processing device and the image display apparatus including the same according to another embodiment of the present disclosure may further include a second decoder to decode the image data reconstructed in the decoder.

Meanwhile, the memory may store the image data compressed in the encoder based on the image data received from the external electronic device being dynamic High Dynamic Range (HDR) image data.

Meanwhile, the signal processing device and the image display apparatus including the same according to another embodiment of the present disclosure may further include an HDR processor to perform a high dynamic range process for the image data reconstructed in the second decoder and an image quality processor to perform an image quality process of the image data processed in the HDR processor.

Meanwhile, a signal processing device and an image display apparatus including the same according to further another embodiment of the present disclosure includes: a memory to store image data received based on the image data received from an external electronic device being compressed data and a decoder to reconstruct the image data stored in the memory.

Meanwhile, the memory may store the received image data based on the image data received from the external electronic device being dynamic High Dynamic Range (HDR) image data.

Meanwhile, Meanwhile, a signal processing device and an image display apparatus including the same according to further another embodiment of the present disclosure may further include an HDR processor to perform a high dynamic range process for the image data reconstructed in the decoder and an image quality processor to perform an image quality process of the image data processed in the HDR processor.

Effect of the Disclosure

A signal processing device and an image display apparatus including the same according to further another embodiment of the present disclosure includes: a first decoder to reconstruct image data received from an external electronic device, an encoder to compress the image data reconstructed in the first decoder, a memory to store the image data compressed in the encoder, and a second decoder to reconstruct the image data stored in the memory. Accordingly, despite of the increases of the amount of the input image data and the bandwidth thereof, the image data may be stored in the memory efficiently.

Meanwhile, the memory may store the image data compressed in the encoder based on the image data received from the external electronic device being dynamic High Dynamic Range (HDR) image data. Accordingly, the input dynamic HDR image data may be stored in the memory efficiently.

Meanwhile, the memory does not store the image data compressed in the encoder based on the image data received from the external electronic device being static HDR image data. Accordingly, the image data may be stored in the memory efficiently.

Meanwhile, the signal processing device and the image display apparatus including the same according to an embodiment of the present disclosure may receive metadata during a black period of a first frame, wherein the first decoder may reconstruct the image data received from the external electronic device, wherein the encoder may compress the image data reconstructed in the first decoder, and during a second frame subsequent from the first frame, wherein the memory may store the image data compressed in the encoder. Accordingly, the image data may be stored in the memory efficiently.

Meanwhile, the memory may store the image data compressed in the encoder based on dynamic HDR mode information being included in the received metadata. Accordingly, the image data based on a dynamic HDR mode may be stored in the memory efficiently.

Meanwhile, the memory does not store the image data compressed in the encoder based on static HDR mode information being included in the received metadata. Accordingly, the image data may be stored in the memory efficiently.

Meanwhile, the image data received from the external electronic device may include image data compressed based on the HDMI 2.1 standard. Accordingly, the image data based on the HDMI 2.1 standard may be stored in the memory efficiently.

Meanwhile, color information and brightness information of the image data received from the external electronic device may change in a frame unit. Accordingly, the dynamic HDR mode is performed.

Meanwhile, the encoder may change a compression rate in the image compression based on an amount of data of the image data received from the external electronic device or a receiving bandwidth when receiving the image data. Accordingly, the image data may be stored in the memory efficiently.

Meanwhile, while the image data is received from the external electronic device, after a first timing, based on second image data being received from a second electronic device, the encoder may increase a compression rate in the image compression after the first timing. Accordingly, the image data may be stored in the memory efficiently.

Meanwhile, the signal processing device and the image display apparatus including the same according to an embodiment of the present disclosure may further include: an HDR processor to perform a high dynamic range process for the image data reconstructed in the second decoder; and an image quality processor to perform an image quality process of the image data processed in the HDR processor. Accordingly, a high dynamic range (HDR) process for the input image becomes available.

Meanwhile, a signal processing device and an image display apparatus including the same according to another embodiment of the present disclosure includes: an encoder to compress image data received from an external electronic device, a memory to store the image data compressed in the encoder, and a decoder to reconstruct the image data stored in the memory. Accordingly, despite of the increases of the amount of the input image data and the bandwidth thereof, the image data may be stored in the memory efficiently.

Meanwhile, the signal processing device and the image display apparatus including the same according to another embodiment of the present disclosure may further include a second decoder to decode the image data reconstructed in the decoder.

Meanwhile, the memory may store the image data compressed in the encoder based on the image data received from the external electronic device being dynamic High Dynamic Range (HDR) image data. Accordingly, the image data may be stored in the memory efficiently.

Meanwhile, the signal processing device and the image display apparatus including the same according to another embodiment of the present disclosure may further include an HDR processor to perform a high dynamic range process for the image data reconstructed in the second decoder and an image quality processor to perform an image quality process of the image data processed in the HDR processor. Accordingly, a high dynamic range (HDR) process for the input image becomes available.

Meanwhile, a signal processing device and an image display apparatus including the same according to further another embodiment of the present disclosure includes: a memory to store image data received based on the image data received from an external electronic device being compressed data and a decoder to reconstruct the image data stored in the memory. Accordingly, despite of the increases of the amount of the input image data and the bandwidth thereof, the image data may be stored in the memory efficiently.

Meanwhile, the memory may store the received image data based on the image data received from the external electronic device being dynamic High Dynamic Range (HDR) image data. Accordingly, the image data may be stored in the memory efficiently.

Meanwhile, a signal processing device and an image display apparatus including the same according to further another embodiment of the present disclosure may further include an HDR processor to perform a high dynamic range process for the image data reconstructed in the decoder and an image quality processor to perform an image quality process of the image data processed in the HDR processor. Accordingly, a high dynamic range (HDR) process for the input image becomes available.

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
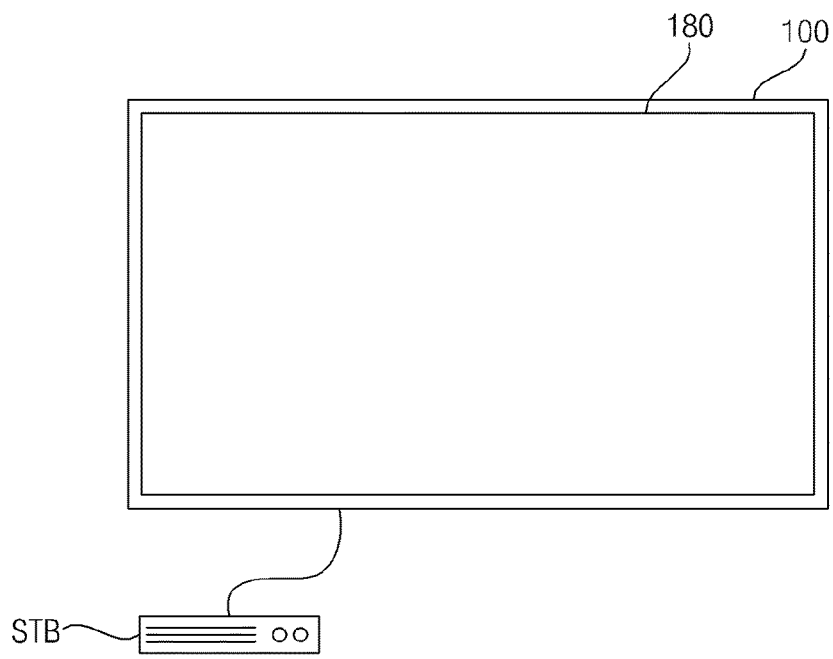
FIG. 1 is a diagram showing an image display system according to an embodiment of the present disclosure.

FIG. 1 is a diagram showing an image display system according to an embodiment of the present disclosure.

Referring to the drawing, an image display system 10 according to an embodiment of the present disclosure may include an image display apparatus 100.

Meanwhile, the display 180 may be implemented with any one of various panels. For example, the display 180 may be any one of a liquid crystal display panel (LCD panel), an organic light emitting diode panel (OLED panel), an inorganic light emitting diode panel (LED panel).

In the present disclosure, an example in which the display 180 includes the organic light emitting diode panel (OLED panel) is mainly described.

Meanwhile, the OLED panel exhibits a faster response speed than the LED and is excellent in color reproduction.

Accordingly, if the display 180 includes an OLED panel, it is preferable that the signal processor 170 (see FIG. 2) of the image display apparatus 100 performs image quality processing for the OLED panel.

The image display apparatus 100 may be connected to an external electronic device in a wired or wireless manner and exchange data.

FIG. 1 illustrates that the image display apparatus 100 is connected to a set-top box (STB) in a wired manner.

For example, the image display apparatus 100 and the set-top box (STB) may perform data communication in the HDMI standard.

Based on the HDMI 2.1 standard, the image data compressed based on the display stream compression (DSC) scheme are transmitted, and the dynamic HDR is supported.

Accordingly, in the case that the set-top box (STB) transmits image data based on the HDMI 2.1 standard, specifically, in the case that the set-top box (STB) transmits dynamic HDR image data, the image display apparatus 100 needs to store the input image data during calculating a parameter for the HDR process.

In this case, based on the HDMI 2.1 standard, the amount of data increases about 10 times in comparison with the HDMI 2.0 standard, the amount of data to be processed or to be stored in the image display apparatus 100 also increases proportionally to the increase.

To solve the problem, the image display apparatus 100 according to an embodiment of the present disclosure includes a first decoder 1110 for reconstructing image data received from an external electronic device, an encoder 1115 for compressing the image data reconstructed in the first decoder 1110, a memory 1120 for storing the image data compressed in the encoder 1115, and a second decoder 1125 for reconstructing the image data stored in the memory 1120. Accordingly, despite of the increases of the amount of the input image data and the bandwidth thereof, the image data may be stored in the memory 1120 efficiently. Particularly, the data are compressed and stored in the memory 1120 through the encoder 1115, the image data may be stored in the memory 1120 efficiently.

Meanwhile, the set-top box (STB) may be a broadcasting receiving device, a game device, and the like.

Meanwhile, the image display apparatus 100 in FIG. 1 may be a TV, a monitor, a tablet PC, a mobile terminal, a display for a vehicle, etc.

Figure 2:
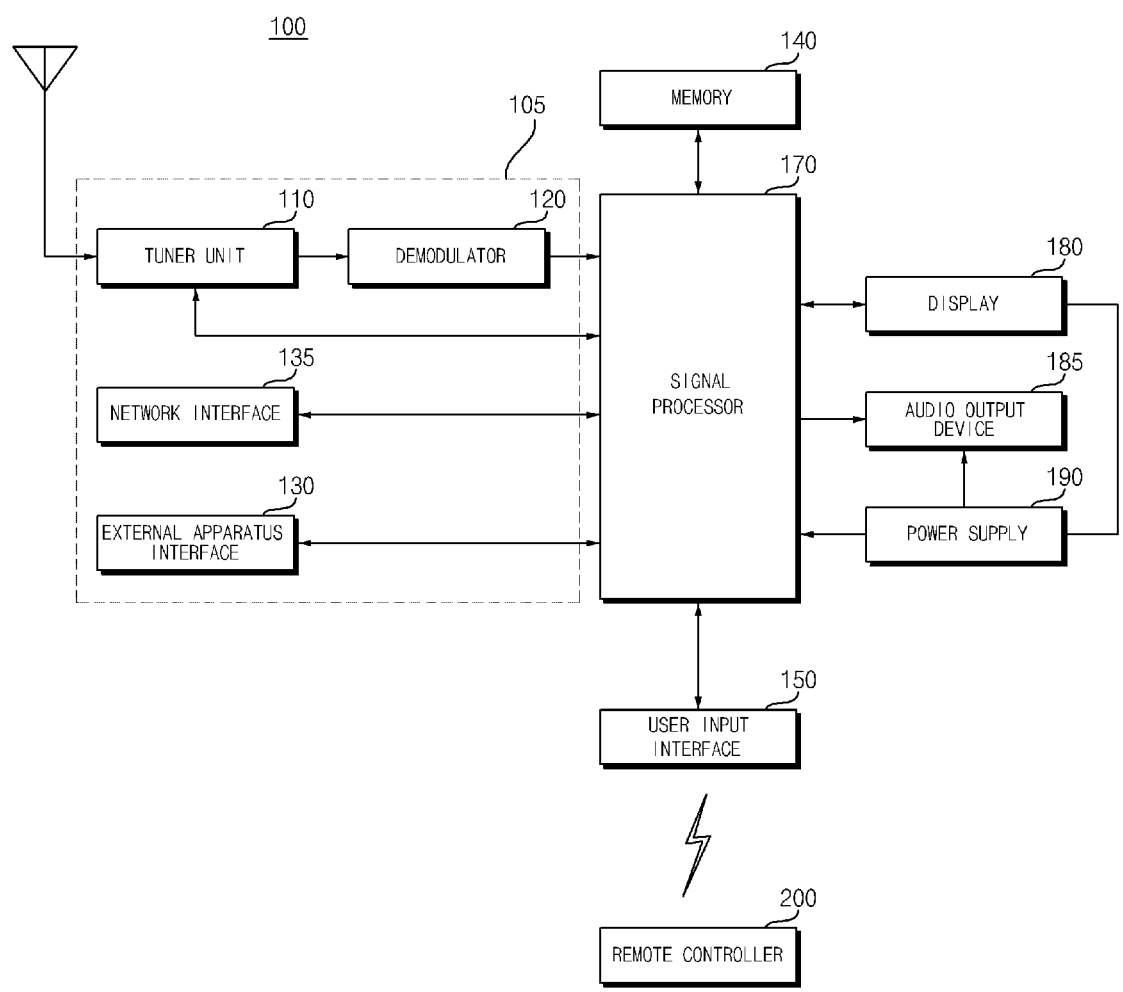
FIG. 2 is an example of an internal block diagram of the image display apparatus of FIG. 1.

FIG. 2 is an example of an internal block diagram of the image display apparatus of FIG. 1.

Referring to FIG. 2, the image display apparatus 100 according to an embodiment of the present disclosure includes an image receiver 105, an external apparatus interface 130, a memory 140, a user input interface 150, a sensor device (not shown), a signal processor 170, a display 180, and an audio output device 185.

The image receiver 105 may include a tuner 110, a demodulator 120, a network interface 135, and an external apparatus interface 130.

Meanwhile, unlike the drawing, the image receiver 105 may include only the tuner 110, the demodulator 120, and the external apparatus interface 130. That is, the network interface 135 may not be included.

The tuner 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or a audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner 110 can process a digital broadcast signal or an analog broadcast signal. The analog baseband image or audio signal (CVBS/SIF) output from the tuner 110 may be directly input to the signal processor 170.

Meanwhile, the tuner 110 can include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner 110 and performs a demodulation operation.

The demodulator 120 may perform demodulation and channel decoding and then output a stream signal TS. At this time, the stream signal may be a multiplexed signal of an image signal, a audio signal, or a data signal.

The stream signal output from the demodulator 120 may be input to the signal processor 170. The signal processor 170 performs demultiplexing, image/audio signal processing, and the like, and then outputs an image to the display 180 and outputs audio to the audio output device 185.

The external apparatus interface 130 may transmit or receive data with a connected external apparatus (not shown), e.g., a set-top box 50. To this end, the external apparatus interface 130 may include an A/V input and output device (not shown).

The external apparatus interface 130 may be connected in wired or wirelessly to an external apparatus such as a digital versatile disk (DVD), a Blu ray, a game equipment, a camera, a camcorder, a computer (note book), and a set-top box, and may perform an input/output operation with an external apparatus.

The A/V input and output device may receive image and audio signals from an external apparatus. Meanwhile, a wireless transceiver (not shown) may perform short-range wireless communication with other electronic apparatus.

Through the wireless transceiver (not shown), the external apparatus interface 130 may exchange data with an adjacent mobile terminal 600. In particular, in a mirroring mode, the external apparatus interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless transceiver (not shown).

The memory 140 may store a program for each signal processing and control in the signal processor 170, and may store signal-processed image, audio, or data signal.

In addition, the memory 140 may serve to temporarily store image, audio, or data signal input to the external apparatus interface 130. In addition, the memory 140 may store information on a certain broadcast channel through a channel memory function such as a channel map.

Although FIG. 2 illustrates that the memory is provided separately from the signal processor 170, the scope of the present disclosure is not limited thereto. The memory 140 may be included in the signal processor 170.

The user input interface 150 transmits a signal input by the user to the signal processor 170 or transmits a signal from the signal processor 170 to the user.

For example, it may transmit/receive a user input signal such as power on/off, channel selection, screen setting, etc., from a remote controller 200, may transfer a user input signal input from a local key (not shown) such as a power key, a channel key, a volume key, a set value, etc., to the signal processor 170, may transfer a user input signal input from a sensor device (not shown) that senses a user's gesture to the signal processor 170, or may transmit a signal from the signal processor 170 to the sensor device (not shown).

The signal processor 170 may demultiplex the input stream through the tuner 110, the demodulator 120, the network interface 135, or the external apparatus interface 130, or process the demultiplexed signals to generate and output a signal for image or audio output.

For example, the signal processor 170 receives a broadcast signal received by the image receiver 105 or an HDMI signal, and perform signal processing based on the received broadcast signal or the HDMI signal to thereby output a processed image signal.

The image signal processed by the signal processor 170 is input to the display 180, and may be displayed as an image corresponding to the image signal. In addition, the image signal processed by the signal processor 170 may be input to the external output apparatus through the external apparatus interface 130.

The audio signal processed by the signal processor 170 may be output to the audio output device 185 as an audio signal. In addition, audio signal processed by the signal processor 170 may be input to the external output apparatus through the external apparatus interface 130.

Although not shown in FIG. 2, the signal processor 170 may include a demultiplexer, an image processor, and the like. That is, the signal processor 170 may perform a variety of signal processing and thus it may be implemented in the form of a system on chip (SOC). This will be described later with reference to FIG. 3.

In addition, the signal processor 170 can control the overall operation of the image display apparatus 100. For example, the signal processor 170 may control the tuner 110 to control the tuning of the RF broadcast corresponding to the channel selected by the user or the previously stored channel.

In addition, the signal processor 170 may control the image display apparatus 100 based on a user command input through the user input interface 150 or an internal program.

Meanwhile, the signal processor 170 may control the display 180 to display an image. At this time, the image displayed on the display 180 may be a still image or a moving image, and may be a 2D image or a 3D image.

Meanwhile, the signal processor 170 may display a certain object in an image displayed on the display 180. For example, the object may be at least one of a connected web screen (newspaper, magazine, etc.), an electronic program guide (EPG), various menus, a widget, an icon, a still image, a moving image, or a text.

Meanwhile, the signal processor 170 may recognize the position of the user based on the image photographed by a photographing device (not shown). For example, the distance (z-axis coordinate) between a user and the image display apparatus 100 can be determined. In addition, the x-axis coordinate and the y-axis coordinate in the display 180 corresponding to a user position can be determined.

The display 180 generates a driving signal by converting an image signal, a data signal, an OSD signal, a control signal processed by the signal processor 170, an image signal, a data signal, a control signal, and the like received from the external apparatus interface 130.

Meanwhile, the display 180 may be configured as a touch screen and used as an input device in addition to an output device.

The audio output device 185 receives a signal processed by the signal processor 170 and outputs it as an audio.

The photographing device (not shown) photographs a user. The photographing device (not shown) may be implemented by a single camera, but the present disclosure is not limited thereto and may be implemented by a plurality of cameras. Image information photographed by the photographing device (not shown) may be input to the signal processor 170.

The signal processor 170 may sense a gesture of the user based on each of the images photographed by the photographing device (not shown), the signals detected from the sensor device (not shown), or a combination thereof.

The power supply 190 supplies corresponding power to the image display apparatus 100. Particularly, the power may be supplied to a controller 170 which can be implemented in the form of a system on chip (SOC), a display 180 for displaying an image, and an audio output device 185 for outputting an audio.

Specifically, the power supply 190 may include a converter for converting an AC power into a DC power, and a DC/DC converter for converting the level of the DC power.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present disclosure, and specific operation and apparatus do not limit the scope of the present disclosure.

Figure 3:
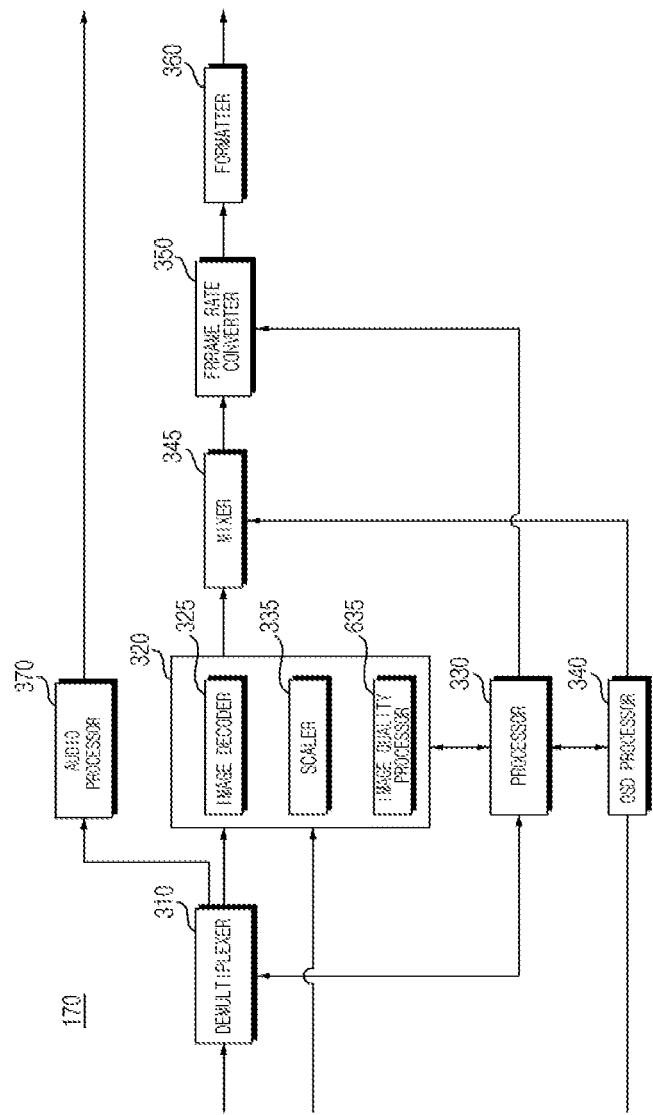
FIG. 3 is an example of an internal block diagram of the signal processor in FIG. 2.

FIG. 3 is an example of an internal block diagram of the signal processor in FIG. 2.

Referring to the drawing, the signal processor 170 according to an embodiment of the present disclosure may include a demultiplexer 310, an image processor 320, a processor 330, and an audio processor 370. In addition, the signal processor 170 may further include and a data processor (not shown).

The demultiplexer 310 demultiplexes the input stream. For example, when an MPEG-2 TS is input, it can be demultiplexed into image, audio, and data signal, respectively. Here, the stream signal input to the demultiplexer 310 may be a stream signal output from the tuner 110, the demodulator 120, or the external apparatus interface 130.

The image processor 320 may perform signal processing on an input image. For example, the image processor 320 may perform image processing on an image signal demultiplexed by the demultiplexer 310.

To this end, the image processor 320 may include an image decoder 325, a scaler 335, an image quality processor 635, an image encoder (not shown), an OSD processor 340, a frame rate converter 350, a formatter 360, etc.

The image decoder 325 decodes a demultiplexed image signal, and the scaler 335 performs scaling so that the resolution of the decoded image signal can be output from the display 180.

The image decoder 325 can include a decoder of various standards. For example, a 3D image decoder for MPEG-2, H.264 decoder, a color image, and a depth image, and a decoder for a multiple view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the image decoder 325 or the like.

For example, the image quality processor 625 may perform noise reduction processing on an input image signal, extend a resolution of high gray level of the input image signal, perform image resolution enhancement, perform high dynamic range (HDR)-based signal processing, change a frame rate, perform image quality processing suitable for properties of a panel, especially an OLED panel, etc.

The OSD processor 340 generates an OSD signal based on a user input or by itself. For example, based on a user input signal, the OSD processor 340 may generate a signal for displaying various information as a graphic or a text on the screen of the display 180. The generated OSD signal may include various data such as a user interface screen of the image display apparatus 100, various menu screens, a widget, and an icon. In addition, the generated OSD signal may include a 2D object or a 3D object.

In addition, the OSD processor 340 may generate a pointer that can be displayed on the display, based on a pointing signal input from the remote controller 200. In particular, such a pointer may be generated by a pointing signal processor, and the OSD processor 340 may include such a pointing signal processor (not shown). Obviously, the pointing signal processor (not shown) may be provided separately from the OSD processor 340.

The mixer 345 may mix an OSD signal generated by the OSD processor 340 with a decoded image signal image-processed by the image processor 320. The mixed image signal is supplied to the frame rate converter 350.

Meanwhile, the formatter 360 may change a format of an input image signal into a format suitable for displaying the image signal on a display and output the image signal in the changed format.

In particular, the formatter 360 may change a format of an image signal to correspond to a display panel.

Meanwhile, the formatter 360 may change the format of the image signal. For example, it may change the format of the 3D image signal into any one of various 3D formats such as a side by side format, a top/down format, a frame sequential format, an interlaced format, a checker box format, and the like.

The processor 330 may control overall operations of the image display apparatus 100 or the signal processor 170.

For example, the processor 330 may control the tuner 110 to control the tuning of an RF broadcast corresponding to a channel selected by a user or a previously stored channel.

In addition, the processor 330 may control the image display apparatus 100 based on a user command input through the user input interface 150 or an internal program.

In addition, the processor 330 may transmit data to the network interface 135 or to the external apparatus interface 130.

In addition, the processor 330 may control the demultiplexer 310, the image processor 320, and the like in the signal processor 170.

Meanwhile, the audio processor 370 in the signal processor 170 may perform the audio processing of the demultiplexed audio signal. To this end, the audio processor 370 may include various decoders.

In addition, the audio processor 370 in the signal processor 170 may process a base, a treble, a volume control, and the like.

The data processor (not shown) in the signal processor 170 may perform data processing of the demultiplexed data signal. For example, when the demultiplexed data signal is a coded data signal, it can be decoded. The encoded data signal may be electronic program guide information including broadcast information such as a start time and an end time of a broadcast program broadcasted on each channel.

Meanwhile, a block diagram of the signal processor 170 shown in FIG. 3 is a block diagram for an embodiment of the present disclosure. Each component of the block diagram may be integrated, added, or omitted according to a specification of the signal processor 170 actually implemented.

In particular, the frame rate converter 350 and the formatter 360 may be provided separately in addition to the image processor 320.

Figure 4A:
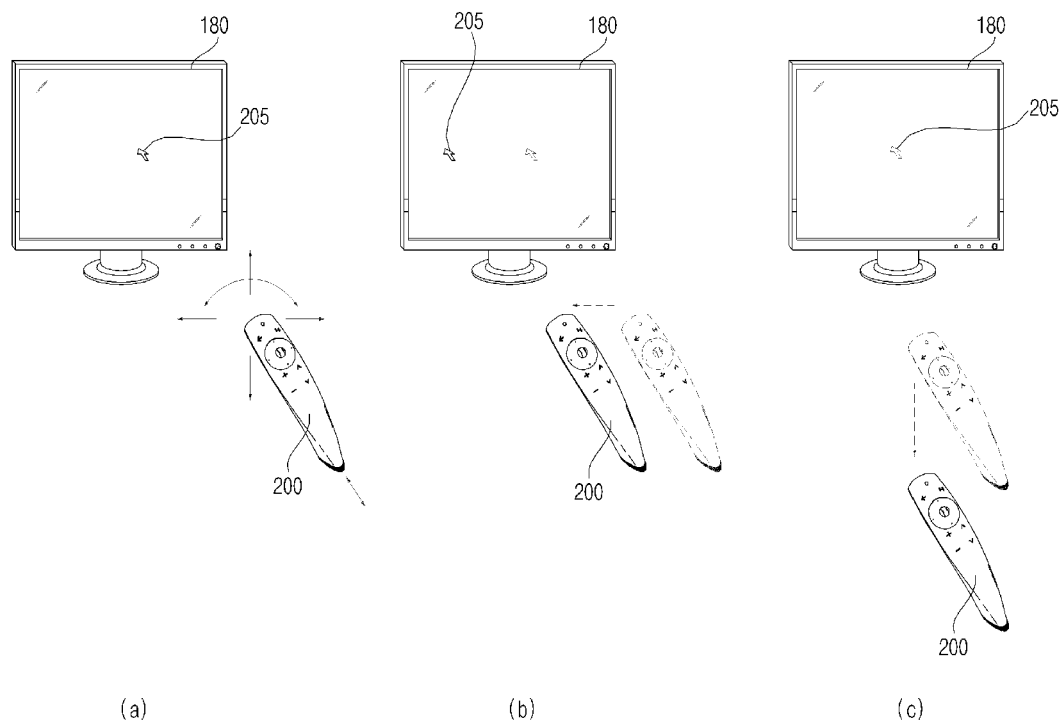
FIG. 4A is a diagram illustrating a control method of a remote controller of FIG. 2.

FIG. 4A is a diagram illustrating a control method of a remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the drawing.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180 while pressing a specific button of the remote controller 200. Thus, a selection area within the display 180 corresponding to the pointer 205 may be zoomed in so that it can be displayed to be enlarged. On the other hand, when the user moves the remote controller 200 close to the display 180, the selection area within the display 180 corresponding to the pointer 205 may be zoomed out so that it can be displayed to be reduced. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
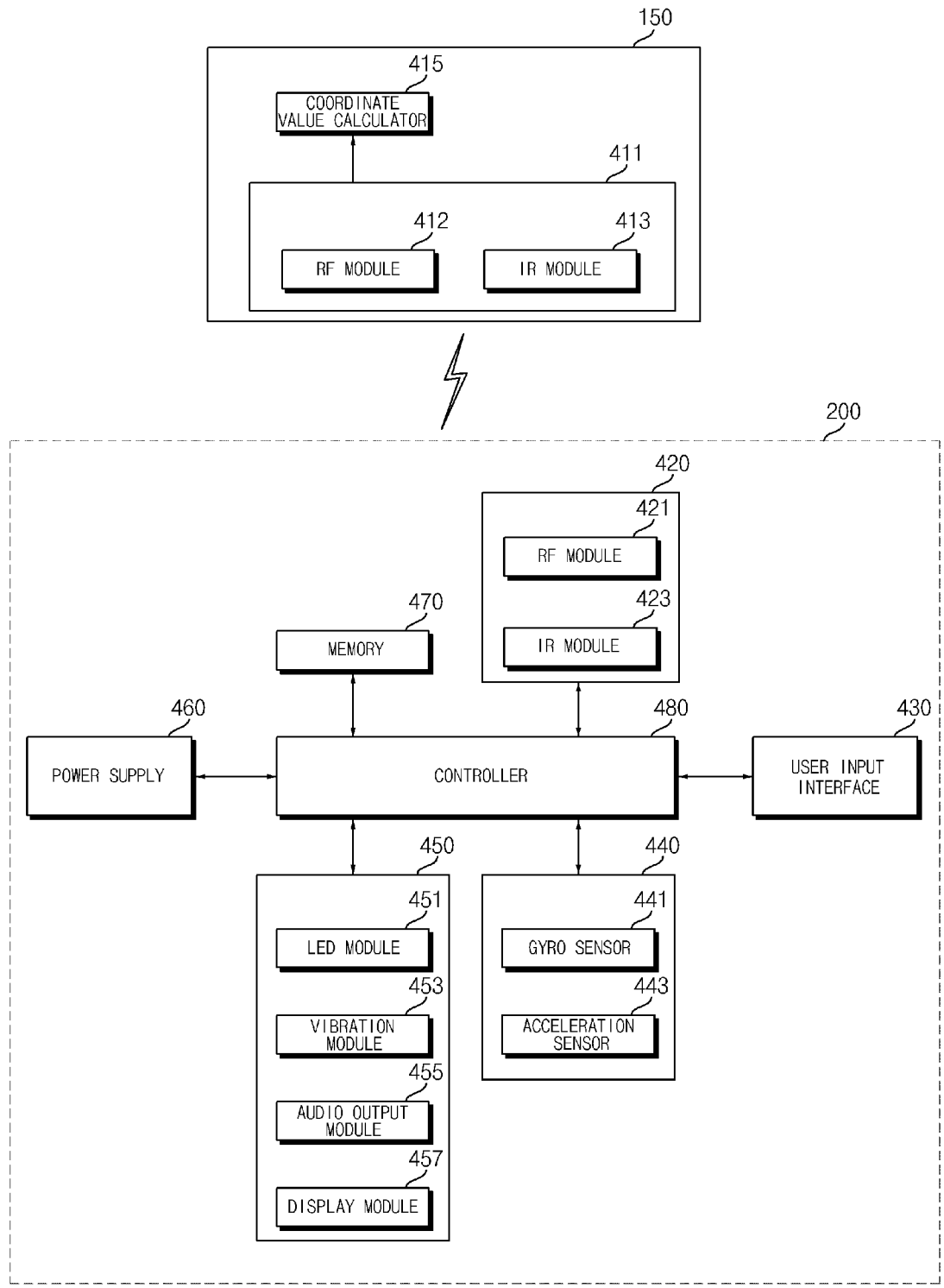
FIG. 4B is an internal block diagram of the remote controller of FIG. 2.

FIG. 4B is an internal block diagram of the remote controller of FIG. 2.

Referring to the drawing, the remote controller 200 includes a wireless transceiver 425, a user input device 430, a sensor device 440, an output device 450, a power supply 460, a memory 470, and a controller 480.

The wireless transceiver 425 transmits/receives a signal to/from any one of the image display apparatuses according to the embodiments of the present disclosure described above. Among the image display apparatuses according to the embodiments of the present disclosure, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to an IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input device 430 may be implemented by a keypad, a button, a touch pad, a touch screen, or the like. The user may operate the user input device 430 to input a command related to the image display apparatus 100 to the remote controller 200. When the user input device 430 includes a hard key button, the user can input a command related to the image display apparatus 100 to the remote controller 200 through a push operation of the hard key button. When the user input device 430 includes a touch screen, the user may touch a soft key of the touch screen to input the command related to the image display apparatus 100 to the remote controller 200. In addition, the user input device 430 may include various types of input means such as a scroll key, a jog key, etc., which can be operated by the user, and the present disclosure does not limit the scope of the present disclosure.

The sensor device 440 may include a gyro sensor 441 or an acceleration sensor 443. The gyro sensor 441 may sense information about the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output device 450 may output an image or an audio signal corresponding to the operation of the user input device 430 or a signal transmitted from the image display apparatus 100. Through the output device 450, the user may recognize whether the user input device 430 is operated or whether the image display apparatus 100 is controlled.

For example, the output device 450 may include an LED module 451 that is turned on when the user input device 430 is operated or a signal is transmitted/received to/from the image display apparatus 100 through the wireless transceiver 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information about a frequency band or the like for wirelessly transmitting and receiving a signal to/from the image display apparatus 100 paired with the remote controller 200 in the memory 470 and may refer to the stored information.

The controller 480 controls various matters related to the control of the remote controller 200. The controller 480 may transmit a signal corresponding to a certain key operation of the user input device 430 or a signal corresponding to the motion of the remote controller 200 sensed by the sensor device 440 to the image display apparatus 100 through the wireless transceiver 425.

The user input interface 150 of the image display apparatus 100 includes a wireless transceiver 151 that can wirelessly transmit and receive a signal to and from the remote controller 200 and a coordinate value calculator 415 that can calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to a IR communication standard.

The coordinate value calculator 415 may correct a hand shake or an error from a signal corresponding to the operation of the remote controller 200 received through the wireless transceiver 151 and calculate the coordinate value (x, y) of the pointer 205 to be displayed on the display 180.

The transmission signal of the remote controller 200 inputted to the image display apparatus 100 through the user input interface 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the controller 180 without a separate correction process of hand shake or error.

For another example, unlike the drawing, the coordinate value calculator 415 may be provided in the signal processor 170, not in the user input interface 150.

Figure 5:
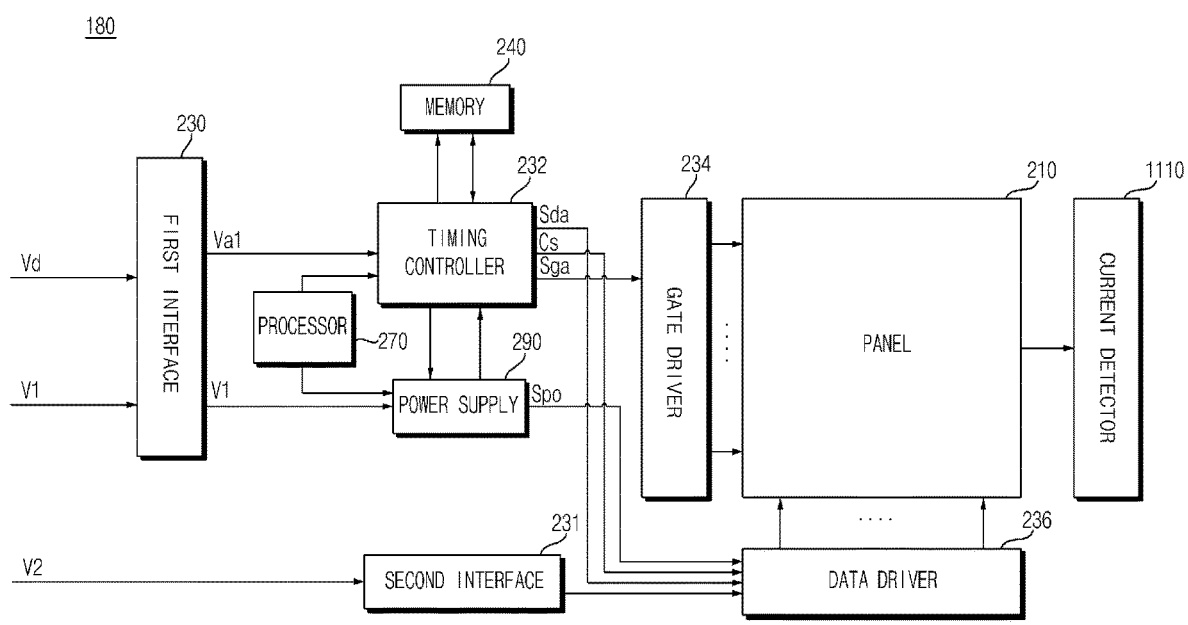
FIG. 5 is an internal block diagram of a display of FIG. 2.

FIG. 5 is an internal block diagram of a display of FIG. 2.

Referring to FIG. 5, the organic light emitting diode panel-based display 180 may include an organic light emitting diode panel 210, a first interface 230, a second interface 231, a timing controller 232, a gate driver 234, a data driver 236, a memory 240, a processor 270, a power supply 290, a current detector 510, and the like.

The display 180 receives an image signal Vd, a first DC power V1, and a second DC power V2, and may display a certain image based on the image signal Vd.

Meanwhile, the first interface 230 in the display 180 may receive the image signal Vd and the first DC power V1 from the signal processor 170.

Here, the first DC power V1 may be used for the operation of the power supply 290 and the timing controller 232 in the display 180.

Next, the second interface 231 may receive a second DC power V2 from an external power supply 190. Meanwhile, the second DC power V2 may be input to the data driver 236 in the display 180.

The timing controller 232 may output a data driving signal Sda and a gate driving signal Sga, based on the image signal Vd.

For example, when the first interface 230 converts the input image signal Vd and outputs the converted image signal va1, the timing controller 232 may output the data driving signal Sda and the gate driving signal Sga based on the converted image signal va1.

The timing controller 232 may further receive a control signal, a vertical synchronization signal Vsync, and the like, in addition to the image signal Vd from the signal processor 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

At this time, when the panel 210 includes a RGBW subpixel, the data driving signal Sda may be a data driving signal for driving of RGBW subpixel.

Meanwhile, the timing controller 232 may further output a control signal Cs to the gate driver 234.

The gate driver 234 and the data driver 236 supply a scan signal and an image signal to the organic light emitting diode panel 210 through a gate line GL and a data line DL respectively, according to the gate driving signal Sga and the data driving signal Sda from the timing controller 232. Accordingly, the organic light emitting diode panel 210 displays a certain image.

Meanwhile, the organic light emitting diode panel 210 may include an organic light emitting layer. In order to display an image, a plurality of gate lines GL and data lines DL may be disposed in a matrix form in each pixel corresponding to the organic light emitting layer.

Meanwhile, the data driver 236 may output a data signal to the organic light emitting diode panel 210 based on a second DC power V2 from the second interface 231.

The power supply 290 may supply various power supplies to the gate driver 234, the data driver 236, the timing controller 232, and the like.

The current detector 510 may detect the current flowing in a sub-pixel of the organic light emitting diode panel 210. The detected current may be input to the processor 270 or the like, for a cumulative current calculation.

The processor 270 may perform each type of control of the display 180. For example, the processor 270 may control the gate driver 234, the data driver 236, the timing controller 232, and the like.

Meanwhile, the processor 270 may receive current information flowing in a sub-pixel of the organic light emitting diode panel 210 from the current detector 510.

In addition, the processor 270 may calculate the accumulated current of each subpixel of the organic light emitting diode panel 210, based on information of current flowing through the subpixel of the organic light emitting diode panel 210. The calculated accumulated current may be stored in the memory 240.

Meanwhile, the processor 270 may determine as burn-in, if the accumulated current of each sub-pixel of the organic light emitting diode panel 210 is equal to or greater than an allowable value.

For example, if the accumulated current of each subpixel of the OLED panel 210 is equal to or higher than 300000 A, the processor 270 may determine that a corresponding subpixel is a burn-in subpixel.

Meanwhile, if the accumulated current of each subpixel of the OLED panel 210 is close to an allowable value, the processor 270 may determine that a corresponding subpixel is a subpixel expected to be burn in.

Meanwhile, based on a current detected by the current detector 510, the processor 270 may determine that a sub-pixel having the greatest accumulated current is an expected burn-in subpixel.

Figure 6A:
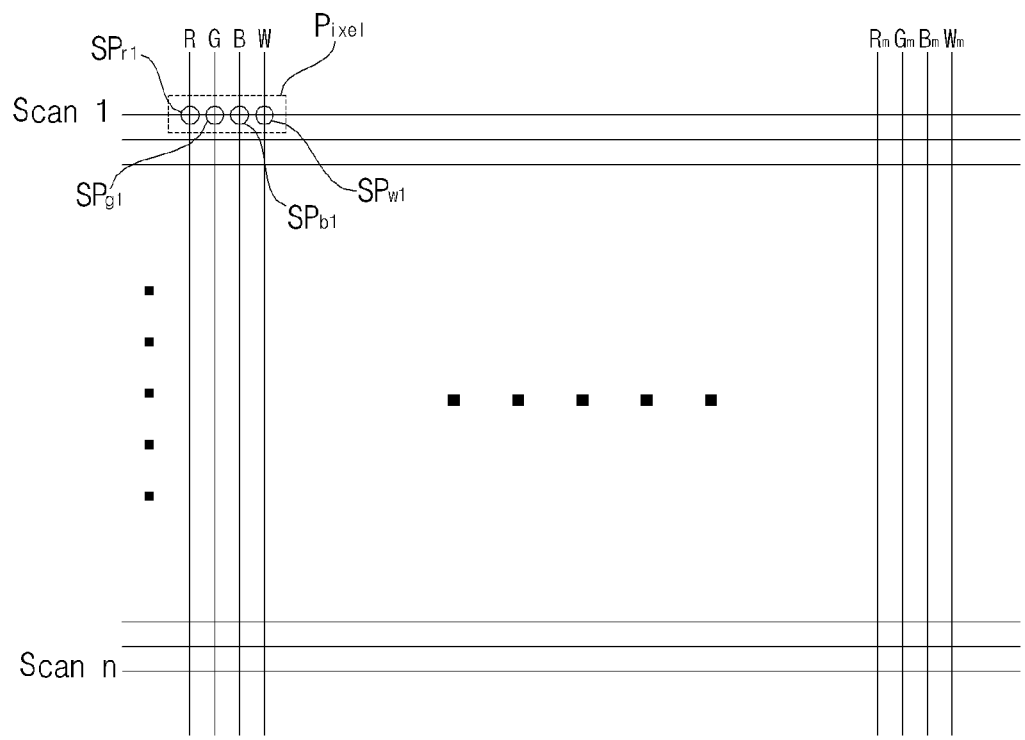
FIG. 6A and FIG. 6B are diagrams referred to in the description of an organic light emitting diode panel of FIG. 5.
Figure 6B:
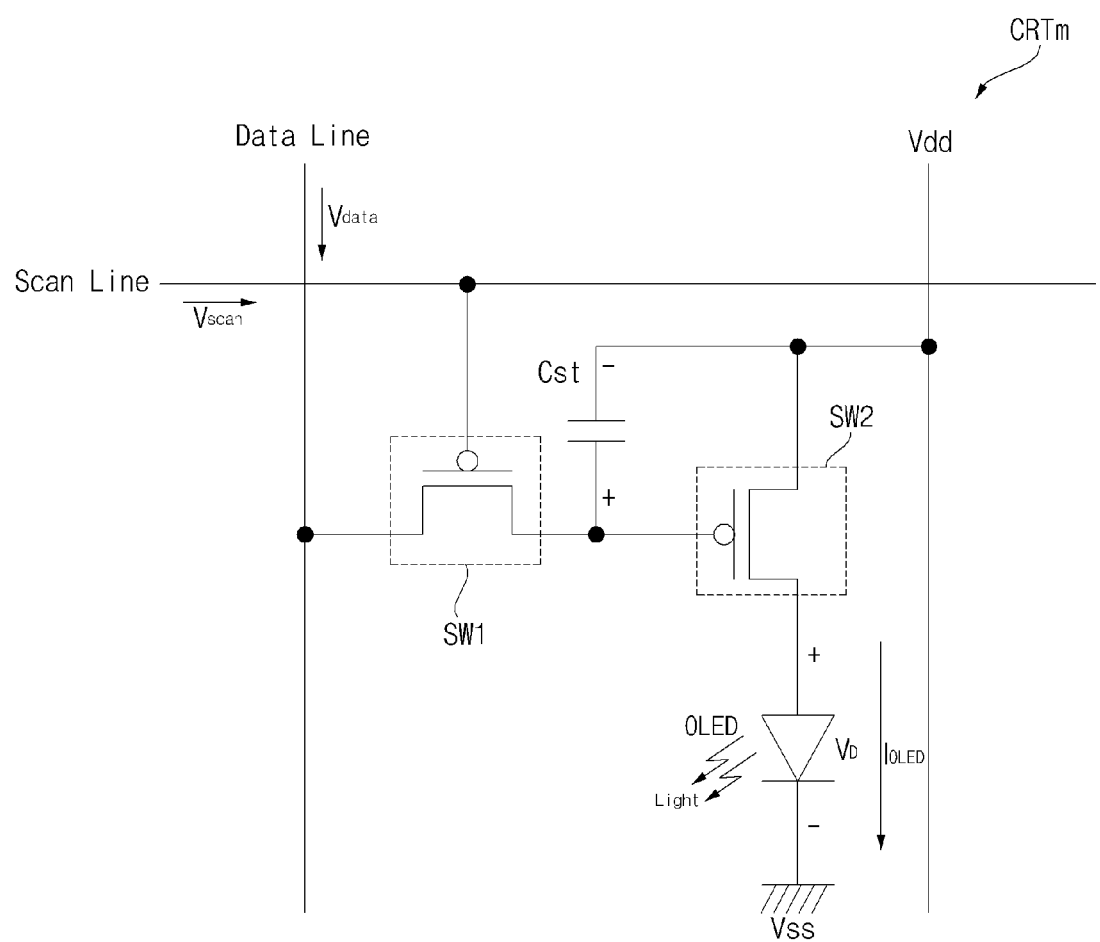

FIG. 6A and FIG. 6B are diagrams referred to in the description of an organic light emitting diode panel of FIG. 5.

Firstly, FIG. 6A is a diagram illustrating a pixel in the organic light emitting diode panel 210.

Referring to drawing, the organic light emitting diode panel 210 may include a plurality of scan lines Scan1 to Scann and a plurality of data lines R1, G1, B1, W1 to Rm, Gm, Bm, Wm intersecting the scan lines.

Meanwhile, a pixel (subpixel) is defined in an intersecting area of the scan line and the data line in the organic light emitting diode panel 210. In the drawing, a pixel including sub-pixels SR1, SG1, SB1 and SW1 of RGBW is shown.

FIG. 6B illustrates a circuit of any one sub-pixel in the pixel of the organic light emitting diode panel of FIG. 6A.

Referring to drawing, an organic light emitting sub pixel circuit (CRTm) may include, as an active type, a scan switching element SW1, a storage capacitor Cst, a drive switching element SW2, and an organic light emitting layer (OLED).

The scan switching element SW1 is turned on according to the input scan signal Vdscan, as a scan line is connected to a gate terminal. When it is turned on, the input data signal Vdata is transferred to the gate terminal of a drive switching element SW2 or one end of the storage capacitor Cst.

The storage capacitor Cst is formed between the gate terminal and the source terminal of the drive switching element SW2, and stores a certain difference between a data signal level transmitted to one end of the storage capacitor Cst and a DC power (VDD) level transmitted to the other terminal of the storage capacitor Cst.

For example, when the data signal has a different level according to a Plume Amplitude Modulation (PAM) method, the power level stored in the storage capacitor Cst varies according to the level difference of the data signal Vdata.

For another example, when the data signal has a different pulse width according to a Pulse Width Modulation (PWM) method, the power level stored in the storage capacitor Cst varies according to the pulse width difference of the data signal Vdata.

The drive switching element SW2 is turned on according to the power level stored in the storage capacitor Cst. When the drive switching element SW2 is turned on, the driving current (IOLED), which is proportional to the stored power level, flows in the organic light emitting layer (OLED). Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), or an electron injecting layer (EIL). In addition, it may include a hole blocking layer, and the like.

Meanwhile, all the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further includes green, red, and blue color filters. Meanwhile, since a white subpixel outputs a white light, a separate color filter is not required.

Meanwhile, in the drawing, it is illustrated that a p-type MOSFET is used for a scan switching element SW1 and a drive switching element SW2, but an n-type MOSFET or other switching element such as a JFET, IGBT, SIC, or the like are also available.

Meanwhile, the pixel is a hold-type element that continuously emits light in the organic light emitting layer (OLED), after a scan signal is applied, during a unit display period, specifically, during a unit frame.

Meanwhile, with development of camera and broadcasting technologies, resolution and vertical synchronization frequencies for input images have improved as well. In particular, there are increasing need of image quality processing on an image signal having 4K resolution and 120 Hz vertical synchronization frequency. Accordingly, a method of improving image quality processing of an input image signal is proposed. A detailed description thereof is hereinafter provided with reference to FIG. 7 and other drawings.

Figure 7:
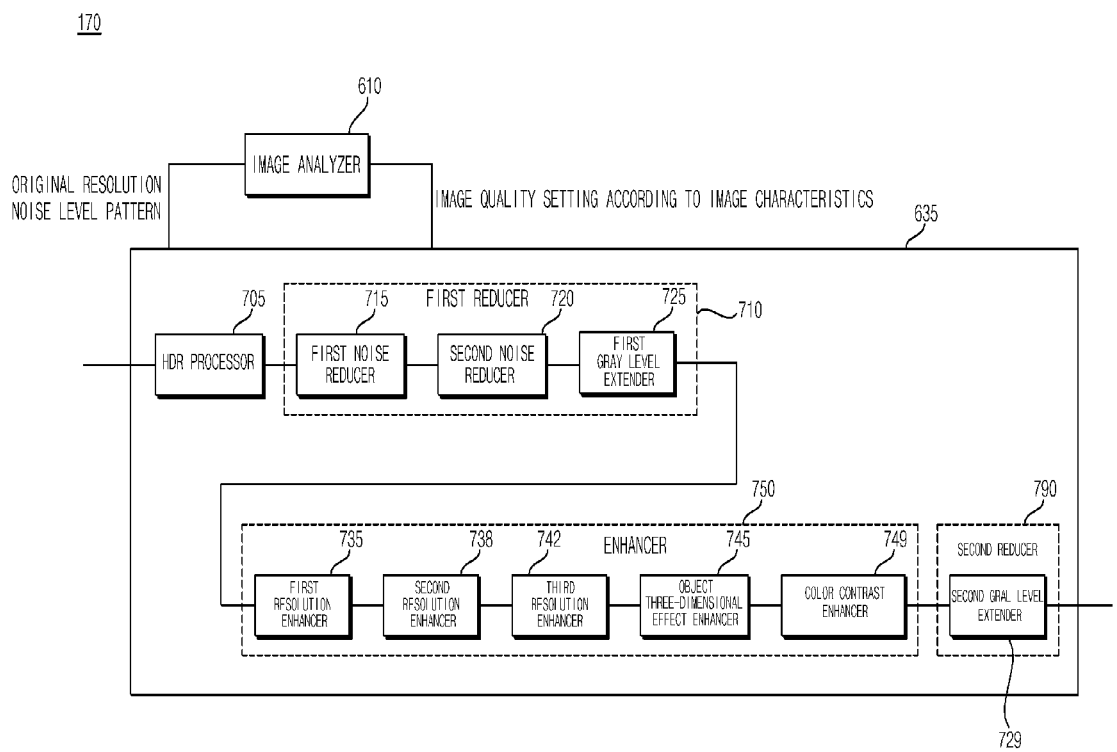
FIG. 7 is an example of an internal block diagram of a signal processing device according to an embodiment of the present disclosure.

FIG. 7 is an example of an internal block diagram of a signal processing device according to an embodiment of the present disclosure.

Meanwhile, a signal processing device 170 in FIG. 7 may correspond to the signal processor 170 in FIG. 2.

First, referring to FIG. 7, the signal processing device 170 according to an embodiment of the present disclosure may include an image analyzer 610 and an image quality processor 635.

The image analyzer 610 may analyze an input image signal, and output information related to the analyzed input image signal.

Meanwhile, the image analyzer 610 may differentiate an object region and a background region of a first input image signal. Alternatively, the image analyzer 610 may calculate a probability or percentage of the object region and the background region of the first input image signal.

The input image signal may be an input image signal from an image receiver 105 or an image decoded by the image decoder 320 in FIG. 3.

In particular, the image analyzer 610 may analyze an input image signal using artificial intelligence (AI), and output information on the analyzed input image signal.

Specifically, the image analyzer 610 may output a resolution, gray level, a noise level, and a pattern of an input image signal, and output information on the analyzed input image signal, especially image setting information, to the image quality processor 635.

The image quality processor 635 may include an HDR processor 705, a first reducer 710, an enhancer 750, and a second reducer 790.

The HDR processor 705 may receive an image signal and perform high dynamic range (HDR) processing on the input image signal.

For example, the HDR processor 705 may convert a standard dynamic range (SDR) image signal into an HDR image signal.

For another example, the HDR processor 705 may receive an image signal, and perform gray level processing on the input image signal for an HDR.

Meanwhile, if an input image signal is an SDR image signal, the HDR processor 705 may bypass gray level conversion, and, if an input image signal is an HDR image signal, the HDR processor 705 perform gray level conversion. Accordingly, despite of the increases of the amount of the input image data and the bandwidth thereof, the image data may be stored in the memory efficiently.

Meanwhile, the HDR processor 705 may perform gray level conversion processing based on a first gray level conversion mode, in which low gray level is to be enhanced and high gray level is to be saturated, and a second gray level conversion mode, in which low gray level and high gray level are somewhat uniformly converted.

The HDR processor 705 may perform gray level conversion processing based on a first gray level conversion curve or a second gray level conversion curve.

For example, the HDR processor 705 may perform gray level conversion processing based on data in a lookup table corresponding to the first gray level conversion curve or based on data in a lookup table corresponding to the second gray level conversion curve.

Specifically, if the first gray level conversion mode is implemented, the HDR processor 705 may perform gray level conversion processing based on data corresponding to the first gray level conversion mode in a lookup table.

More specifically, if the first gray level conversion mode is implemented, the HDR processor 705 may perform gray level conversion processing based on an equation of input data and the first gray level conversion mode in a lookup table determined by the equation. Here, the input data may include video data and metadata.

Meanwhile, if the second gray level conversion mode is implemented, the HDR processor 705 may perform gray level conversion processing based on data corresponding to the second gray level conversion mode in a lookup table.

More specifically, if the second gray level conversion mode is implemented, the HDR processor 705 may perform gray level conversion processing based on an equation of input data and data corresponding to the second gray level conversion mode in a lookup table determined by the equation. Here, the input data may include video data and metadata.

Meanwhile, the HDR processor 705 may select the first gray level conversion mode or the second gray level conversion mode according to a third gray level conversion mode or a fourth gray level conversion mode in a high gray level amplifier 851 in the second reducer 790.

For example, if the third gray level conversion mode is implemented, the high gray level amplifier 851 in the second reducer 790 may perform gray level conversion processing based o data corresponding to the third gray level conversion mode in a lookup table.

Specifically, if the third gray level conversion mode is implemented, the high gray level amplifier 851 in the second reducer 790 may perform gray level conversion processing based on an equation of input data and data corresponding to the third gray level conversion mode in a lookup table determined by the equation. Here, the input data may include video data and metadata.

Meanwhile, if the fourth type gray level conversion is implemented, the high gray level amplifier 851 in the second reducer 790 may perform gray level conversion processing based on data corresponding to the fourth gray level conversion mode in a lookup table.

Specifically, if the fourth gray level conversion mode is implemented, the high gray level amplifier 851 in the second reducer 790 may perform gray level conversion processing based on an equation of input data and data corresponding to the fourth gray level conversion mode in a lookup table determined by the equation. Here, the input data may include video data and metadata.

For example, if the fourth gray level conversion mode is implemented in the high gray level amplifier 851 in the second reducer 790, the HDR processor 705 may implement the second gray level conversion mode.

For another example, if the third gray level conversion mode is implemented in the high gray level amplifier 851 in the second reducer 790, the HDR processor 705 may implement the first gray level conversion mode.

Alternatively, the high gray level amplifier 851 in the second reducer 790 may change a gray level conversion mode based on a gray level conversion mode in the HDR processor 705.

For example, if the second gray level conversion mode is implemented in the HDR processor 705, the high gray level amplifier 851 in the second reducer 790 may perform the fourth gray level conversion mode.

For another example, if the first gray level conversion mode is implemented in the HDR processor 705, the high gray level amplifier 851 in the second reducer 790 may implement the third gray level conversion mode.

Meanwhile, the HDR processor 705 according to an embodiment of the present disclosure may implement a gray level conversion mode so that low gray level and high gray level are converted uniformly.

That is, the HDR processor 705 may perform gray level conversion processing based on the second gray level conversion curve, not the first gray level conversion curve.

Meanwhile, based on the second gray level conversion mode in the HDR processor 705, the second reducer 790 may implement the fourth gray level conversion mode and thereby amplify an upper limit on gray level of a received input signal. Accordingly, despite of the increases of the amount of the input image data and the bandwidth thereof, the image data may be stored in the memory efficiently.

Next, the first reducer 710 may perform noise reduction on an input image signal or an image signal processed by the HDR processor 705.

Specifically, the first reducer 710 may perform multiple stages of noise reduction processing and a first stage of gray level extension processing on an input image signal or an HDR image from the HDR processor 705.

To this end, the first reducer 710 may include a plurality of noise reduction parts 715 and 720 for reducing noise in multiple stages, and a first gray level extender 725 for extending gray level.

Next, the enhancer 750 may perform multiple stages of image resolution enhancement processing on an image from the first reducer 710.

In addition, the enhancer 750 may perform object three-dimensional effect enhancement processing. In addition, the enhancer 750 may perform color or contrast enhancement processing.

To this end, the enhancer 750 may include: a plurality of resolution enhancers 735, 738, 742 for enhancing a resolution of an image in multiple stages; an object three-dimensional effect enhancer 745 for enhancing a three-dimensional effect of an object; and a color contrast enhancer 749 for enhancing color or contrast.

Next, the second reducer 790 may perform a second stage of gray level extension processing based on a noise-reduced image signal received from the first reducer 710.

Meanwhile, the second reducer 790 may amplify an upper limit on gray level of an input signal, and extend a resolution of high gray level of the input signal. Accordingly, despite of the increases of the amount of the input image data and the bandwidth thereof, the image data may be stored in the memory efficiently.

For example, gray level extension may be performed uniformly on the entire gray level range of an input signal. Accordingly, gray level extension is performed uniformly on the entire area of an input image, thereby improving high gray level expression.

Meanwhile, the second reducer 790 may perform gray level amplification and extension based on a signal received from the first gray level extender 725. Accordingly, despite of the increases of the amount of the input image data and the bandwidth thereof, the image data may be stored in the memory efficiently.

Meanwhile, if an input image signal input is an SDR image signal, the second reducer 790 may vary the degree of amplification based on a user input signal. Accordingly, it is possible to improve high gray level expression in response to a user setting.

Meanwhile, if an input image signal is an HDR image signal, the second reducer 790 may perform amplification according to a set value. Accordingly, despite of the increases of the amount of the input image data and the bandwidth thereof, the image data may be stored in the memory efficiently.

Meanwhile, if an input image signal is an HDR image signal, the second reducer 790 may vary the degree of amplification based on a user input signal. Accordingly, it is possible to improve high gray level expression based on a user setting.

Meanwhile, in the case of extending gray level based on a user input signal, the second reducer 790 may vary the degree of extension of gray level. Accordingly, it is possible to improve high gray level expression based on a user's setting.

Meanwhile, the second reducer 790 may amplify an upper limit on gray level based on a gray level conversion mode in the HDR processor 705. Accordingly, despite of the increases of the amount of the input image data and the bandwidth thereof, the image data may be stored in the memory efficiently.

The signal processing device 170 includes the HDR processor 705 configured to receive an image signal and adjust luminance of the input image signal, and the reducer 790 configured to amplify brightness of the image signal received from the HDR processor 705 and increase gray level resolution of the image signal to thereby generate an enhanced image signal. The enhanced image signal provides increased luminance and increased gray level resolution of the image signal while a high dynamic range in a displayed HDR image is maintained.

Meanwhile, the range of brightness of the image signal is adjusted by a control signal received by the signal processing device 170.

Meanwhile, the signal processing device 170 further includes an image analyzer configured to determine whether an input image signal is an HDR signal or an SDR signal, and generate a control signal to be provided to the HDR processor 705. The range of brightness of an input image signal is adjusted by a control signal only when the input image signal is an HDR signal.

Meanwhile, the control signal is received from a controller of an image display apparatus, which relates to signal processing, and the control signal corresponds to a setting of the image display apparatus.

Meanwhile, a resolution of gray level is increased based on amplification of adjusted brightness of an image signal.

Meanwhile, a resolution of gray level is increased based on a control signal received by the signal processing device 170.

Meanwhile, a control signal is received from a controller of an image display apparatus, which relates to signal processing, and the control signal corresponds to a setting of the image display apparatus.

Meanwhile, the reducer 790 may include the high gray level amplifier 851 configured to amplify an upper limit on gray level of an input signal, and a decontourer 842 and 844 configured to extend the resolution of gray level amplified by the high gray level amplifier 851.

The second reducer 790 may include a second gray level extender 729 for a second stage of gray level extension.

Figure 8:
FIG. 8 is a diagram illustrating the set-top box and the image display apparatus shown in FIG. 1.

Meanwhile, the image quality processor 635 in the signal processing device 170 according to the present disclosure is characterized in performing four stages of reduction processing and four stages of image enhancement processing, as shown in FIG. 8.

Here, the four stages of reduction processing may include two stages of noise reduction processing and two stages of gray level extension processing.

Herein, the two stages of noise reduction processing may be performed by the first and second noise reduction parts 715 and 720 in the first reducer 710, and the two stages of gray level extension processing may be performed by the first gray level extender 725 in the first reducer 710 and the second gray level extender 729 in the second reducer 790.

Meanwhile, the four stages of image enhancement processing may include three stages of image resolution enhancement (bit resolution enhancement) and object three-dimensional effect enhancement.

Here, the three stages of image enhancement processing may be performed by the first to third resolution enhancers 735, 738, and 742, and the object three-dimensional effect enhancement may be performed by the object three-dimensional enhancer 745.

Meanwhile, the first characteristic of the signal processing device 170 of the present disclosure lies in applying the same algorithm or similar algorithms to image quality processing multiple times, thereby gradually enhancing an image quality.

To this end, the image quality processor 635 of the signal processing device 170 of the present disclosure may perform image quality processing by applying the same algorithm or similar algorithms two or more times.

Meanwhile, the same algorithm or the similar algorithms implemented by the image quality processor 635 have a different purpose to achieve in each stage. In addition, since image quality processing is performed gradually in multiple stages, there is an advantageous effect to cause a less number of artifacts to appear in an image, resulting in a more natural and more vivid image processing result.

Meanwhile, the same algorithm or the similar algorithms are applied multiple times alternately with a different image quality algorithm, thereby bringing an effect more than simple continuous processing.

Meanwhile, another characteristic of the signal processing device 170 of the present disclosure lies in performing noise reduction processing in multiple stages. Each stage of noise reduction processing may include temporal processing and spatial processing.

Meanwhile, the high dynamic range (HDR) technique utilizes a much greater range of luminosity (nit) than is possible a standard dynamic range (SDR) or any other existing technique, and accordingly a much wide range of contrast may be expressed.

FIG. 8 is a diagram illustrating the set-top box and the image display apparatus shown in FIG. 1.

Referring to the drawing, the set-top box (STB) may operate as a source for transmitting image data, and the image display apparatus 100 may operate as a sink for receiving image data.

In the diagram, it is illustrated that the image display apparatus 100 is connected to the set-top box (STB) in a wired manner.

For example, the image display apparatus 100 and the set-top box (STB) may perform data communication based on the HDMI standard.

Meanwhile, based on the HDMI 2.1 standard, the image data compressed based on the display stream compression (DSC) method is transmitted, and the dynamic HDR is supported.

Accordingly, in the case that the set-top box (STB) transmits image data based on the HDMI 2.1 standard, specifically, in the case that the set-top box (STB) transmits dynamic HDR image data, the image display apparatus 100 needs to store the input image data while calculating a parameter for the HDR process.

In this case, based on the HDMI 2.1 standard, the amount of data increases about 10 times in comparison with the HDMI 2.0 standard, the amount of data to be processed or to be stored in the image display apparatus 100 also increases proportionally to the increase.

Figure 9:
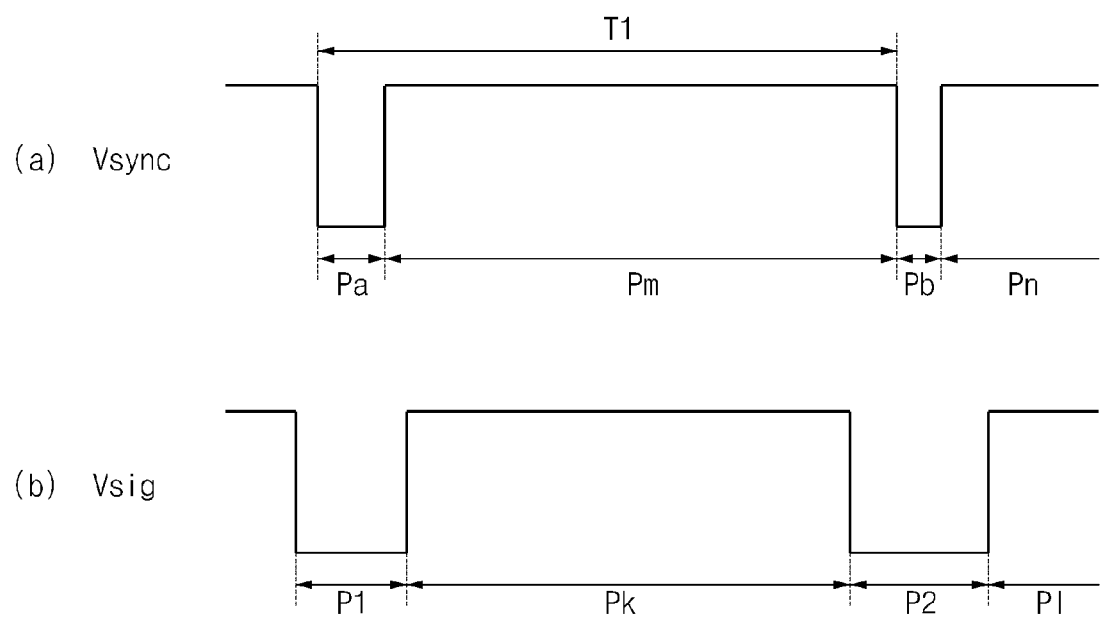
FIG. 9 is a diagram illustrating a vertical synchronization signal and an input data signal that corresponds to the vertical synchronization signal.

FIG. 9 is a diagram illustrating a vertical synchronization signal and an input data signal that corresponds to the vertical synchronization signal.

FIG. 9A illustrates the vertical synchronization signal Vsync and, and FIG. 9B illustrates the input data signal Vsig.

The vertical synchronization signal Vsync has a period T1, is reset in the Pa period and the Pb period, and the image data signal is inputted during the Pm period and the Pn period.

Meanwhile, the input data signal Vsig includes the P1 period and the P2 period that correspond to the Pa period and the Pb period, respectively, and includes the Pk period and the period that correspond to the Pm period and the Pn period, respectively.

The P1 period and the P2 period may correspond to the blank period for receiving metadata, and the Pk period and the P1 period may correspond to the image data receiving section for receiving image data.

During the P1 period, the metadata of the first frame may be received, and during the Pk period, the image data of the first frame may be received.

During the P2 period, the metadata of the second frame may be received, and during the P1 period, the image data of the second frame may be received.

Figure 10:
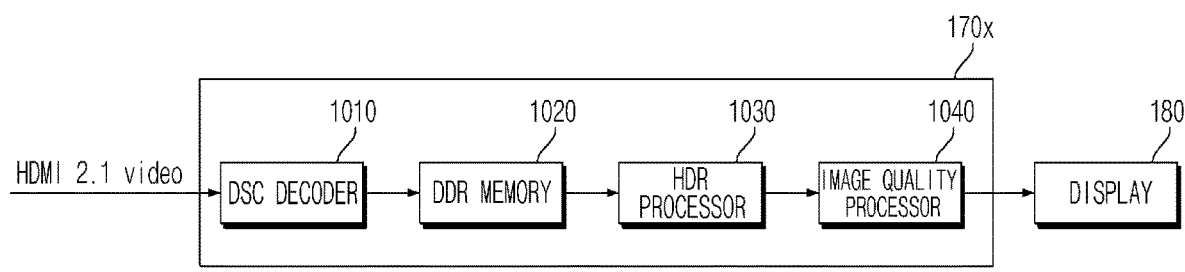
FIG. 10 is a block diagram of an example of the conventional signal processing device.

FIG. 10 is a block diagram of an example of the conventional signal processing device.

According to the drawing, the conventional signal processing device 170x or a signal processor 170x may include a display stream compression (DSC) decoder 1010, a memory 1020, an HDR processor 1030, and an image quality processor 1030.

Based on the HDMI 2.1 standard, the amount of data increases about 10 times in comparison with the HDMI 2.0 standard, and the amount of data to be processed or to be stored in the signal processor 170x also increases proportionally to the increase.

In particular, the amount of data to be processed by the DSC decoder 1010 is approximately 10 times, and the amount of data to be stored in the memory 1020 is approximately 10 times. Accordingly, smooth data processing and data storage become difficult.

In addition, in the case that the input image data is the dynamic HDR, the support therefor becomes difficult.

Accordingly, the present disclosure proposes a method for storing an increasing amount of image data in the memory efficiently, based on the HDMI 2.1 standard. This will be described with reference to FIG. 11 below.

Figure 11:
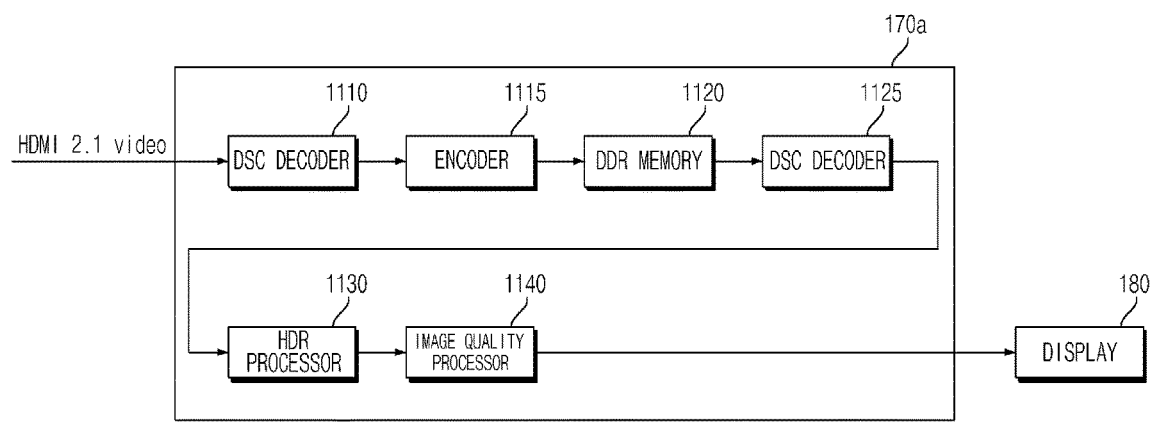
FIG. 11 is a block diagram of an example of a signal processing device according to an embodiment of the present disclosure.

FIG. 11 is a block diagram of an example of a signal processing device according to an embodiment of the present disclosure.

Referring to the drawing, the signal processing device 170 or the signal processor 170 according to an embodiment of the present disclosure includes a first decoder 1110 for reconstructing image data received from an external electronic device (STB), an encoder 1115 for compressing the image data reconstructed in the first decoder 1110, a memory 1120 for storing the image data compressed in the encoder 1115, and a second decoder 1125 for reconstructing the image data stored in the memory 1120. Accordingly, despite of the increases of the amount of the input image data and the bandwidth thereof, the image data may be stored in the memory 1120 efficiently.

Meanwhile, it is preferable that the first decoder 1110 and the encoder 1115 use different encoding/decoding schemes.

It is preferable that the encoder 1115 and the second decoder 1125 use the same encoding/decoding scheme.

In this case, the first decoder 1110 may include a display stream compressor (DSC) decoder. The display stream compressor (DSC) decoder may be a decoder for transmission based on the HDMI 2.1 standard.

Accordingly, the first decoder 1110 may decode an input DSC-compressed image data and may output the reconstructed image data.

The encoder 1115 may compress the reconstructed image data based on a separate compression codec.

In the case that the image data received from the external electronic device (STB) is dynamic HDR image data, the memory 1120 may store the image data compressed in the encoder 1115. Accordingly, the input dynamic HDR image data may be stored in the memory 1120 efficiently.

Meanwhile, in the case that the image data received from the external electronic device (STB) is static HDR image data, the memory 1120 does not store the image data compressed in the encoder 1115. Accordingly, the image data may be stored in the memory 1120 efficiently.

The signal processing device 170 or the signal processor 170 according to an embodiment of the present disclosure, in the case that the image data received from the external electronic device (STB) is the dynamic HDR image data, receives the metadata during a black period P1 of a first frame, the first decoder 1110 reconstructs the image data received from the external electronic device (STB), and the encoder 1115 compresses the image data reconstructed in the first decoder 1110 during the image data receiving period Pk of the first frame.

Further, during a second frame P2, P1 subsequent from the first frame, the memory 1120 may store the image data compressed in the encoder 1115. Accordingly, the image data may be stored in the memory 1120 efficiently.

Meanwhile, in the case that dynamic HDR mode information is included in the received metadata, the memory 1120 may store the image data compressed in the encoder 1115.

Particularly, during the blank period P1 of the first frame, in the case that the dynamic HDR mode information is included in the received metadata, the memory 1120 may store the image data compressed in the encoder 1115 during the second frame (P2, P1).

Accordingly, the image data based on the dynamic HDR mode may be stored in the memory 1120 efficiently.

Meanwhile, in the case that static HDR mode information is included in the received metadata, the memory 1120 does not store the image data compressed in the encoder 1115. Accordingly, the image data may be stored in the memory 1120 efficiently.

The image data received from the external electronic device (STB) may include image data compressed based on the HDMI 2.1 standard. Accordingly, the image data based on the HDMI 2.1 standard may be stored in the memory 1120 efficiently.

Color information and brightness information of the image data received from the external electronic device (STB) may change in a frame unit. Accordingly, the dynamic HDR mode is performed.

Meanwhile, the encoder 1115 may change the compression rate in the image compression according to the amount of data of the image data received from the external electronic device (STB) or the receiving bandwidth when receiving the image data.

For example, while the encoder 1115 performs the compression in the compression rate of about 20%, in the case that the amount of data of the image data or the receiving bandwidth when receiving the image data increases, the compression rate may increase up to 30% to 40%. Accordingly, the image data of which the amount of data is decreased or the data bandwidth is decreased may be stored in the memory 1120 efficiently.

Meanwhile, while the image data is received from the external electronic device (STB), after a first timing, in the case that second image data is received from a second electronic device, the encoder 1115 may increase the compression rate in the image compression after the first timing.

For example, as shown in FIG. 8, while the image data is received from an external electronic device (STB), in the case that a second electronic device additionally accesses and the image data is received from the second electronic device, the encoder 1115 may increase the compression rate in the image compression of the image data from the electronic device (STB) after the first timing.

Particularly, while the encoder 1115 performs the compression of the image data from the electronic device (STB) in the compression rate of about 20%, the compression rate of the image data from the electronic device (STB) may increase up to 30% to 40% after the first timing. Accordingly, the image data of which the amount of data is decreased or the data bandwidth is decreased may be stored in the memory 1120 efficiently.

Meanwhile, the signal processor 170 and the image display apparatus including the same according to an embodiment of the present disclosure may further include an HDR processor 1130 for performing a high dynamic range process for the image data reconstructed in the second decoder 1125 and an image quality processor 1140 for performing an image quality process of the image data processed in the HDR processor 1130. Accordingly, a high dynamic range (HDR) process for the input image becomes available.

In the case that the input image data is HDR image data, the HDR processor 1130 may perform a tone mapping in accordance with a dynamic range of the display 180.

The HDR processor 1130 may perform an operation of the HDR processor 705 shown in FIG. 7.

The image quality processor 1140 may convert a size of the input image data in accordance with the resolution of the display 180 and perform various image quality processes.

The image quality processor 1140 may perform an operation of the image quality processor 635 shown in FIG. 7.

For example, the image quality processor 1140 may perform the operations of the first reducer 710, the enhancer 750, and the second reducer 790 except the image quality processor 635 shown in FIG. 7.

Figure 12:
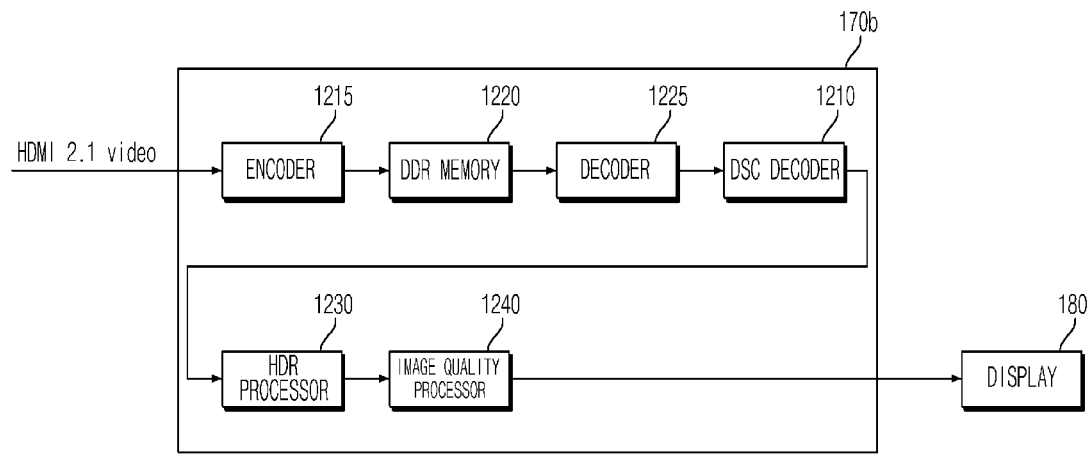
FIG. 12 is a block diagram of an example of a signal processing device according to another embodiment of the present disclosure.

FIG. 12 is a block diagram of an example of a signal processing device according to another embodiment of the present disclosure.

Referring to the drawing, a signal processing device 170b or a signal processor 170b according to another embodiment of the present disclosure includes an encoder 1215 for compressing the image data received from an external electronic device (STB), a memory 1220 for storing the image data compressed in the encoder 1215, and a decoder 1225 for reconstructing the image data stored in the memory 1220. Accordingly, despite of the increases of the amount of the input image data and the bandwidth thereof, the image data may be stored in the memory 1220 efficiently.

Meanwhile, the signal processing device 170b or the signal processor 170b according to another embodiment of the present disclosure may further include a second decoder 1210 for reconstructing DSC-compressed image data at the end of the decoder 1225.

The encoder 1215 and the decoder 1225 may have the same encoding/decoding scheme.

Different from the signal processing device 170 shown in FIG. 11, according to the signal processing device 170*b* shown in FIG. 12, the DSC decoder 1210 is disposed at the end of the decoder 1225, not in front of the encoder 1215.

Accordingly, the DSC-compressed image data input to the signal processing device 170*b* are not reconstructed, but the encoder 1215 may compress the DSC-compressed image data by a separate compression codec.

The memory 1220 may store the data for which the DSC-compressed image data are further compressed, and the data may be stored in the memory 1220 efficiently.

The decoder 1225 decodes the compressed data stored in the memory 1220, and the second decoder 1225 decodes and reconstructs the DSC-compressed image data.

In the case that the image data received from the external electronic device (STB) is the dynamic HDR image data, the memory 1220 may store the image data compressed in the encoder 1215. Accordingly, the input dynamic HDR image data may be stored in the memory 1220 efficiently.

Meanwhile, in the case that the image data received from the external electronic device (STB) is the static HDR image data, the memory 1220 does not store the image data compressed in the encoder 1215. Accordingly, the image data may be stored in the memory 1220 efficiently.

The signal processing device 170*b* or the signal processor 170*b* according to an embodiment of the present disclosure, in the case that the image data received from the external electronic device (STB) is the dynamic HDR image data, receives the metadata during the black period P1 of the first frame, and the encoder 1215 compresses the image data reconstructed in the first decoder 1210 during the image data receiving period Pk of the first frame.

Further, during the second frame P2, P1 subsequent from the first frame, the memory 1220 may store the image data compressed in the encoder 1215. Accordingly, the image data may be stored in the memory 1220 efficiently.

Meanwhile, in the case that dynamic HDR mode information is included in the received metadata, the memory 1220 may store the image data compressed in the encoder 1215.

Particularly, during a blank period P1 of the first frame, in the case that the dynamic HDR mode information is included in the received metadata, the memory 1220 may store the image data compressed in the encoder 1215 during a second frame (P2, P1).

Accordingly, the image data based on the dynamic HDR mode may be stored in the memory 1220 efficiently.

Meanwhile, in the case that static HDR mode information is included in the received metadata, the memory 1220 does not store the image data compressed in the encoder 1215. Accordingly, the image data may be stored in the memory 1220 efficiently.

The image data received from the external electronic device (STB) may include image data compressed based on the HDMI 2.1 standard. Accordingly, the image data based on the HDMI 2.1 standard may be stored in the memory 1220 efficiently.

Color information and brightness information of the image data received from the external electronic device (STB) may change in a frame unit. Accordingly, the dynamic HDR mode is performed.

Meanwhile, the encoder 1215 may change the compression rate in the image compression based on the amount of data of the image data received from the external electronic device (STB) or the receiving bandwidth when receiving the image data.

For example, while the encoder 1215 performs the compression in the compression rate of about 20%, in the case that the amount of data of the image data or the receiving bandwidth when receiving the image data increases, the compression rate may increase up to 30% to 40%. Accordingly, the image data of which the amount of data is decreased or the data bandwidth is decreased may be stored in the memory 1220 efficiently.

Meanwhile, while the image data is received from the external electronic device (STB), after a first timing, in the case that second image data is received from a second electronic device, the encoder 1215 may increase the compression rate in the image compression after the first timing.

For example, as shown in FIG. 8, while the image data is received from an external electronic device (STB), in the case that a second electronic device additionally accesses and the image data is received from the second electronic device, the encoder 1215 may increase the compression rate in the image compression of the image data from the electronic device (STB) after the first timing.

Particularly, while the encoder 1215 performs the compression of the image data from the electronic device (STB) in the compression rate of about 20%, the compression rate of the image data from the electronic device (STB) may increase up to 30% to 40% after the first timing. Accordingly, the image data of which the amount of data is decreased or the data bandwidth is decreased may be stored in the memory 1220 efficiently.

Meanwhile, the signal processor 170*b* and the image display apparatus including the same according to an embodiment of the present disclosure may further include an HDR processor 1230 for performing a high dynamic range process for the image data reconstructed in the second decoder 1210 and an image quality processor 1240 for performing an image quality process of the image data processed in the HDR processor 1230. Accordingly, a high dynamic range (HDR) process for the input image becomes available.

In the case that the input image data is HDR image data, the HDR processor 1230 may perform a tone mapping in accordance with a dynamic range of the display 180.

The image quality processor 1240 may convert a size of the input image data in accordance with the resolution of the display 180 and perform various image quality processes.

Figure 13:
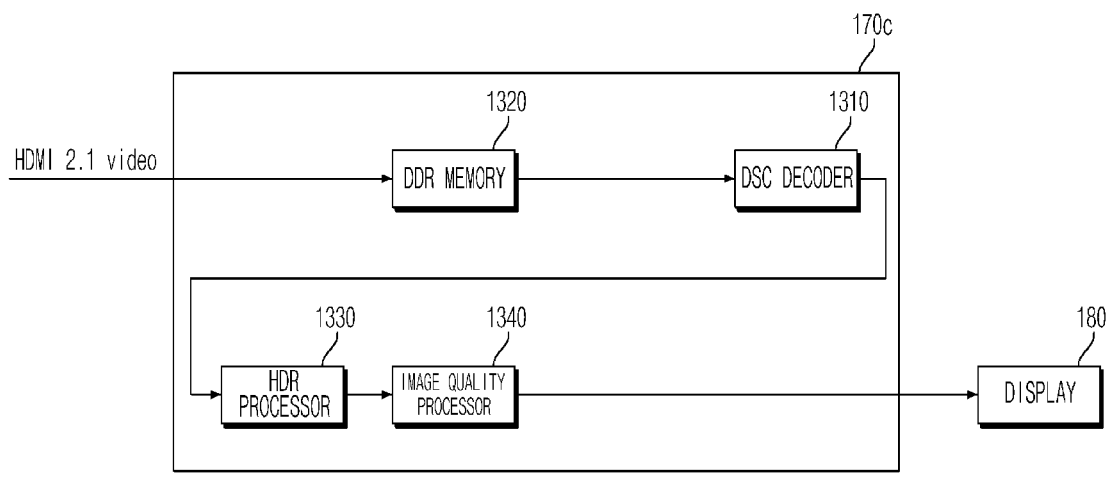
FIG. 13 is a block diagram of an example of a signal processing device according to another embodiment of the present disclosure.

FIG. 13 is a block diagram of an example of a signal processing device according to another embodiment of the present disclosure.

Referring to the drawing, in the case that the image data received from an external electronic device (STB) is compressed data, a signal processing device 170*c* or a signal processor 170*c* according to another embodiment of the present disclosure includes a memory 1320 for storing the received image data and a decoder 1325 for reconstructing the image data stored in the memory 1320.

For example, in the case that the image data input to the signal processing device 170*c* is DSC-compressed image data, the memory 1320 may store the DSC-compressed image data without decoding and without any change. Accordingly, the amount of data stored in the memory 1320 may be reduced.

The decoder 1325 decodes the compressed data stored in the memory 1320.

The decoder 1325 may include a display stream compression (DSC) decoder. The display stream compression (DSC) decoder may be a decoder for transmission based on the HDMI 2.1 standard.

Meanwhile, in the case that the image data received from the external electronic device (STB) is dynamic HDR image data and the DSC-compressed image data, the memory 1320 may store the image data without decoding and without any change. Accordingly, the input dynamic HDR image data may be stored in the memory 1320 efficiently.

Meanwhile, in the case that the image data received from the external electronic device (STB) is static HDR image data, the memory 1320 does not store the input image data. Accordingly, the image data may be stored in the memory 1320 efficiently.

In the case that dynamic HDR mode information is included in the received metadata and the input image data are the DSC-compressed image data, the memory 1320 may store the image data without decoding and without any change. Accordingly, the input dynamic HDR image data may be stored in the memory 1320 efficiently.

Meanwhile, in the case that static HDR mode information is included in the received metadata, the memory 1320 does not store the input image data. Accordingly, the image data may be stored in the memory 1320 efficiently.

The image data received from the external electronic device (STB) may include image data compressed based on the HDMI 2.1 standard. Accordingly, the image data based on the HDMI 2.1 standard may be stored in the memory 1320 efficiently.

Color information and brightness information of the image data received from the external electronic device (STB) may change in a frame unit. Accordingly, the dynamic HDR mode is performed.

Meanwhile, the signal processor 170c and the image display apparatus including the same according to an embodiment of the present disclosure may further include an HDR processor 1330 for performing a high dynamic range process for the image data reconstructed in the decoder 1310 and an image quality processor 1340 for performing an image quality process of the image data processed in the HDR processor 1330. Accordingly, a high dynamic range (HDR) process for the input image becomes available.

In the case that the input image data is HDR image data, the HDR processor 1330 may perform a tone mapping in accordance with a dynamic range of the display 180.

The image quality processor 1340 may convert a size of the input image data in accordance with the resolution of the display 180 and perform various image quality processes.

While the present disclosure has been particularly shown and described with reference to exemplary embodiments thereof, it is clearly understood that the present disclosure is not limited to the specific embodiment described above, and various modifications are available to those ordinary skilled in the art without departing from the subject matter claimed in the accompanying claims. Further, the various modifications should not be individually understood from the technical concept or prospect of the present disclosure.

What is claimed is:

1. A signal processing device comprising:
   a first decoder to reconstruct image data received from an external electronic device;
   an encoder to compress the image data reconstructed in the first decoder;
   a memory to store the image data compressed in the encoder; and
   a second decoder to reconstruct the image data stored in the memory,
   wherein the memory does not store the image data compressed in the encoder based on the image data received from the external electronic device being static high dynamic range (HDR) image data.

2. The signal processing device of claim 1, wherein the memory stores the image data compressed in the encoder based on the image data received from the external electronic device being dynamic HDR image data.

3. The signal processing device of claim 1, wherein metadata is received during a black period of a first frame, wherein the first decoder reconstructs the image data received from the external electronic device, wherein the encoder compresses the image data reconstructed in the first decoder, and
   during a second frame subsequent from the first frame, wherein the memory stores the image data compressed in the encoder.

4. The signal processing device of claim 3, wherein the memory stores the image data compressed in the encoder based on dynamic HDR mode information being included in the received metadata.

5. The signal processing device of claim 3, wherein the memory does not store the image data compressed in the encoder based on static HDR mode information being included in the received metadata.

6. The signal processing device of claim 1, wherein image data received from the external electronic device includes image data compressed based on the High Definition Multimedia Interface (HDMI) 2.1 standard.

7. The signal processing device of claim 1, wherein color information and brightness information of the image data received from the external electronic device change in a frame unit.

8. The signal processing device of claim 1, wherein the encoder changes a compression rate in the image compression based on an amount of data of the image data received from the external electronic device or a receiving bandwidth when receiving the image data.

9. The signal processing device of claim 1, while the image data is received from the external electronic device, after a first timing, based on second image data being received from a second electronic device,
   wherein the encoder increases a compression rate in the image compression after the first timing.

10. The signal processing device of claim 1, further comprising:
    an HDR processor to perform a high dynamic range process for the image data reconstructed in the second decoder; and
    an image quality processor to perform an image quality process of the image data processed in the HDR processor.

11. A signal processing device comprising:
    an encoder to compress image data received from an external electronic device;
    a memory to store the image data compressed in the encoder; and
    a decoder to reconstruct the image data stored in the memory,
    wherein the memory does not store the image data compressed in the encoder based on the image data received from the external electronic device being static high dynamic range (HDR) image data.

12. The signal processing device of claim 11, further comprising a second decoder to decode the image data reconstructed in the decoder.

13. The signal processing device of claim 12, further comprising:
- an HDR processor to perform a high dynamic range process for the image data reconstructed in the second decoder; and
- an image quality processor to perform an image quality process of the image data processed in the HDR processor.

14. The signal processing device of claim 11, wherein the memory stores the image data compressed in the encoder based on the image data received from the external electronic device being dynamic HDR image data.

15. A signal processing device comprising:
- a memory to store image data received based on the image data received from an external electronic device being compressed data; and
- a decoder to reconstruct the image data stored in the memory,
- wherein the memory does not store the image data compressed in the encoder based on the image data received from the external electronic device being static high dynamic range (HDR) image data.

16. The signal processing device of claim 15, wherein the memory stores the received image data based on the image data received from the external electronic device being dynamic HDR image data.

17. The signal processing device of claim 15, further comprising:
- an HDR processor to perform a high dynamic range process for the image data reconstructed in the decoder; and
- an image quality processor to perform an image quality process of the image data processed in the HDR processor.

18. An image display apparatus comprising:
- a display; and
- a signal processing device to control the display,
- wherein the signal processing device comprising:
- a first decoder to reconstruct image data received from an external electronic device;
- an encoder to compress the image data reconstructed in the first decoder;
- a memory to store the image data compressed in the encoder; and
- a second decoder to reconstruct the image data stored in the memory,
- wherein the memory does not store the image data compressed in the encoder based on the image data received from the external electronic device being static high dynamic range (HDR) image data.

19. The image display apparatus of claim 18, wherein the memory stores the image data compressed in the encoder based on the image data received from the external electronic device being dynamic HDR image data.

* * * * *